No. 742,103. PATENTED OCT. 20, 1903.
A. G. TURLAY.
FLUID PRESSURE BRAKE APPLIANCE.
APPLICATION FILED MAY 2, 1903.
NO MODEL. 2 SHEETS—SHEET 1.

WITNESSES: INVENTOR
Abram G. Turlay
BY
ATTORNEYS.

No. 742,103. PATENTED OCT. 20, 1903.
A. G. TURLAY.
FLUID PRESSURE BRAKE APPLIANCE.
APPLICATION FILED MAY 2, 1903.
NO MODEL.
2 SHEETS—SHEET 2.

WITNESSES

INVENTOR
Abram G. Turlay
BY
ATTORNEYS.

No. 742,103. Patented October 20, 1903.

UNITED STATES PATENT OFFICE.

ABRAM GOSS TURLAY, OF CLINTON, ILLINOIS.

FLUID-PRESSURE BRAKE APPLIANCE.

SPECIFICATION forming part of Letters Patent No. 742,103, dated October 20, 1903.

Application filed May 2, 1903. Serial No. 155,319. (No model.)

*To all whom it may concern:*

Be it known that I, ABRAM GOSS TURLAY, a citizen of the United States, and a resident of Clinton, in the county of Dewitt and State of Illinois, have invented a new and Improved Fluid-Pressure Brake Appliance, of which the following is a full, clear, and exact description.

The invention relates to fluid-pressure brakes of the New York or Westinghouse type; and its object is to provide a new and improved safety appliance for connection with the train-pipe in the cab of a locomotive to cause automatic application of the brakes whenever the train-line pressure falls below a certain predetermined pressure, which is frequently caused by reason of stoppage of the air-pump or gradual leakage of air not sufficient to apply the brakes or to cause the triple valve to move and allow small quantities of air to pass from the auxiliary reservoir to the brake-cylinder and out through a leakage-groove without applying the brake.

The invention consists of novel features and parts and combinations of the same, as will be more fully described hereinafter and then pointed out in the claim.

A practical embodiment of the invention is represented in the accompanying drawings, forming a part of this specification, in which similar characters of reference indicate corresponding parts in all the views.

Figure 1:
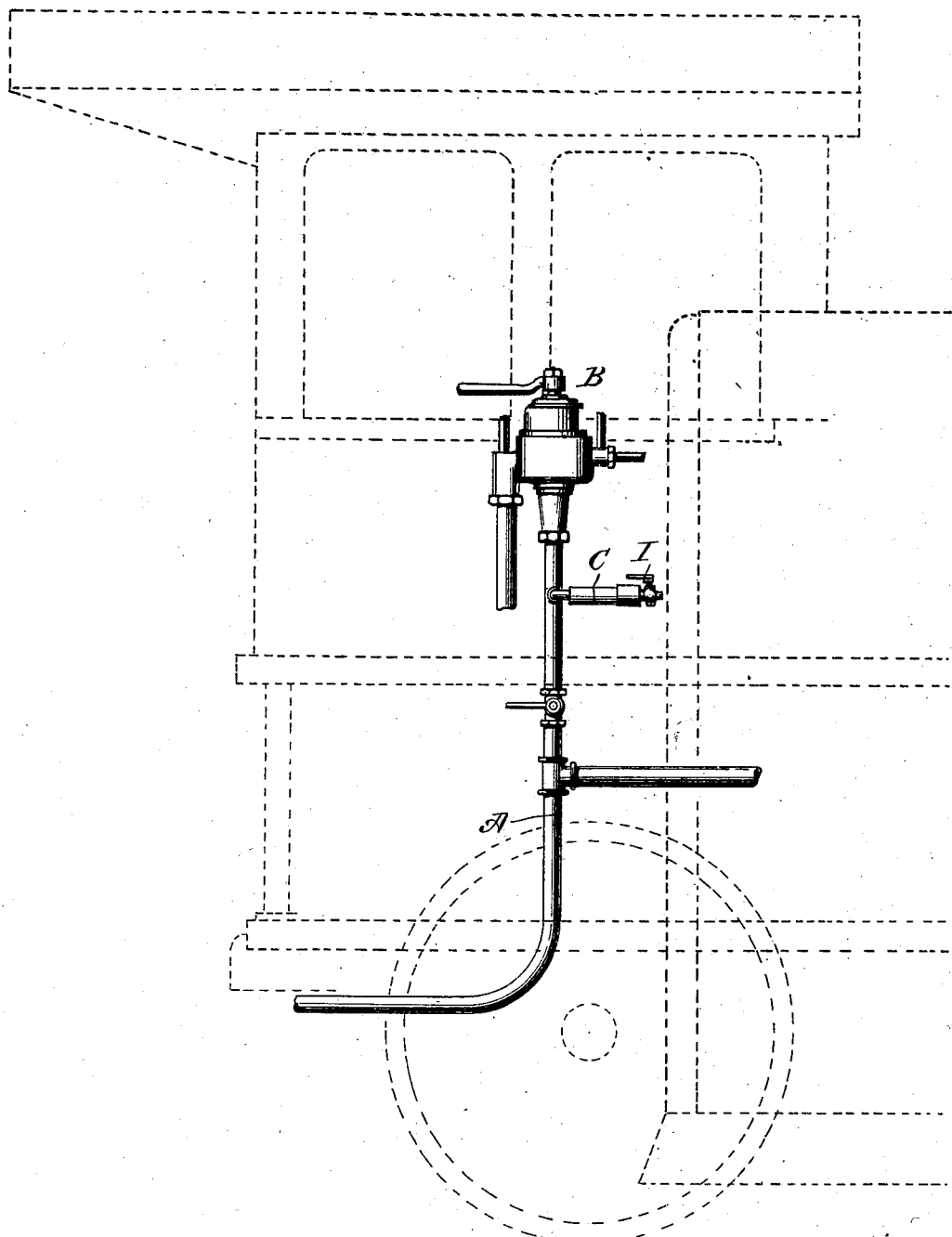
Figure 2:
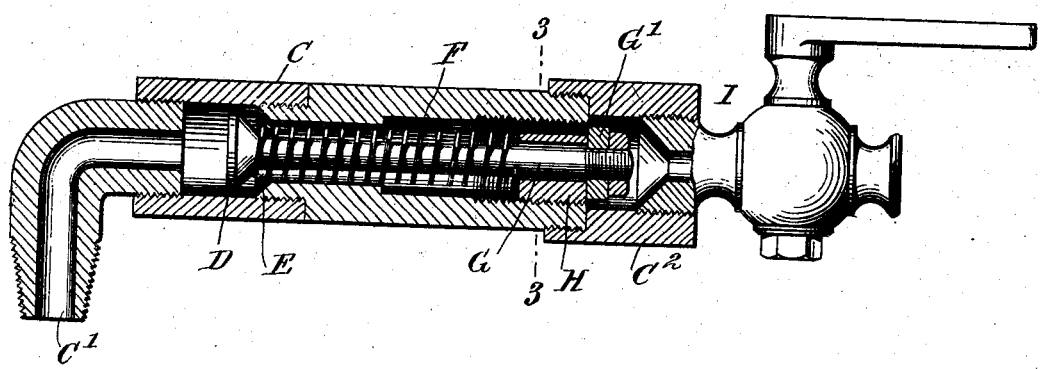
Figure 3:
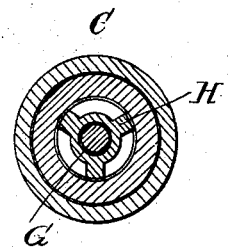

Figure 1 is a side elevation of the improvement as applied. Fig. 2 is an enlarged longitudinal sectional elevation of the improvement, and Fig. 3 is a transverse section of the same on the line 3 3 in Fig. 2.

The safety appliance is attached to a train-pipe A adjacent to an engineer's valve B in the cab of a locomotive, so that the said appliance is under the control of the engineer for the purpose hereinafter more fully described. The safety appliance is provided with a valve-body C, attached at one end C' to the train-pipe A, and in the said valve-body is arranged a valve D, normally held to its seat E by train-line pressure and against the tension of a spring F, set to the minimum train-line pressure of, say, forty-five pounds. The stem G of the valve D is mounted to slide in a spider-bearing H, screwed or otherwise fastened to the valve-body C, and on the said stem is coiled the spring F, resting with its outer end against the said bearing and pressing with its inner end on the valve D to move the latter inwardly toward the train-pipe and into an open position whenever the train-line pressure falls below forty-five pounds, to which the spring F is set. The opening movement of the valve D is limited by nuts G' screwing on the outer end of the valve-stem G and adapted to abut against the outer face of the bearing H.

On the outer or discharge end $C^2$ of the valve-body C is secured a stop-cock I under the control of the engineer to open and close the said stop-cock, and thereby open and close the discharge end of the valve-body C. When the engine is running, the stop-cock I is open and the valve D is held in a closed position on its seat E by train-line pressure passing from the train-pipe into the valve-body C by way of the end C'. Now in case the train-line pressure falls below forty-five pounds through leakage of air or stoppage of the pump then the spring F moves the valve D off its seat E, so that air can escape from the train-pipe by way of the valve-body C and open the cock I to cause an immediate application of the brakes in the entire train. The stop-cock is closed by the engineer whenever air-pressure is pumped into the train-line A preparatory to starting on a trip, so that the valve D is forced to its seat against the tension of the spring F by train-line pressure and without any waste of air as soon as the engineer opens the valve on starting on the trip with full train-pipe pressure, it being understood that when the train-line is charged to the required pressure then the stop-cock is opened by the engineer, and the device is now in working order—that is, the valve D is held to its seat by the normal train-line pressure. In case the hose connection burst or the train-line pipe break, then the stop-cock is closed by the engineer until repairs are made and the train-line pressure is restored. Thus the device is always under the control of the most competent man—namely, the engineer.

Having thus described my invention, I claim as new and desire to secure by Letters Patent—

A fluid-pressure brake provided with an automatic brake-applier on the train-pipe in the cab of the locomotive and under the immediate control of the engineer, the said applier, comprising a valve-body having a valve-seat near one end and provided with a spider near its other end, a valve adapted to be seated on the valve-seat by the train-line pressure and having its stem loosely passing through the spider and terminating short of the end of the valve-body, said end being screw-threaded, a nut on the screw-threaded end of the valve-stem within the valve-body, a spring on the valve-stem between the spider and valve and adapted to open the valve when the train-line pressure falls below a predetermined pressure, and a stop-cock on the outer end of the valve-body and under the control of the engineer, as set forth.

In testimony whereof I have signed my name to this specification in the presence of two subscribing witnesses.

ABRAM GOSS TURLAY.

Witnesses:
GEORGE K. INGHAM,
MYRTLE B. KIRK.